: 
United States Patent
Koh

(10) Patent No.: US 8,887,871 B2
(45) Date of Patent: Nov. 18, 2014

(54) CHECK VALVE OF CYLINDER HEAD

(75) Inventor: Wonhyuk Koh, Seoul (KR)

(73) Assignee: Hyundai Motor Company, Seoul (KR)

( * ) Notice: Subject to any disclaimer, the term of this patent is extended or adjusted under 35 U.S.C. 154(b) by 1578 days.

(21) Appl. No.: 11/775,423

(22) Filed: Jul. 10, 2007

(65) Prior Publication Data

US 2008/0142303 A1    Jun. 19, 2008

(30) Foreign Application Priority Data

Dec. 14, 2006   (KR) .................. 10-2006-0128178

(51) Int. Cl.
*F01M 1/16*    (2006.01)
*F16K 15/02*   (2006.01)

(52) U.S. Cl.
CPC ............... *F16K 15/028* (2013.01); *F01M 1/16* (2013.01)
USPC ............... 184/6.9; 123/196 W; 137/512.1; 138/46

(58) Field of Classification Search
USPC ............. 184/7.3, 6.5–6.9; 137/512.1; 138/46; 123/196 R, 193.5, 196 M
See application file for complete search history.

(56) References Cited

U.S. PATENT DOCUMENTS

| 946,684 | A | * | 1/1910 | Neighbors ............... 137/315.33 |
|---|---|---|---|---|
| 1,947,586 | A | * | 2/1934 | Fletcher ......................... 138/42 |
| 2,069,022 | A | * | 1/1937 | Sisk .............................. 137/495 |
| 2,104,729 | A | * | 1/1938 | Bijur ............................. 184/6.9 |
| RE21,031 | E | * | 3/1939 | Schenk ........................ 184/6.8 |
| 2,296,492 | A | * | 9/1942 | Begley, Sr. .................. 137/512.1 |
| 2,502,933 | A | * | 4/1950 | Du Bois et al. ............... 184/6.9 |
| 2,584,418 | A | * | 2/1952 | Branson ....................... 137/504 |
| 3,331,396 | A | * | 7/1967 | Willis ...................... 137/625.31 |
| 3,415,272 | A | * | 12/1968 | Blackhawk et al. ...... 137/516.13 |
| 3,714,964 | A | * | 2/1973 | Livingston ................. 137/513.3 |
| 3,877,489 | A | * | 4/1975 | Louie et al. .................... 138/46 |
| 3,943,895 | A | * | 3/1976 | Howell ........................ 123/56.7 |
| 4,150,696 | A | * | 4/1979 | Meier et al. .................... 138/44 |
| 4,280,455 | A | * | 7/1981 | Yamaguchi et al. ...... 123/196 M |
| 5,174,330 | A | * | 12/1992 | Golestan et al. ............. 137/504 |
| 5,740,837 | A | * | 4/1998 | Chiang .......................... 138/45 |
| 6,619,247 | B2 | * | 9/2003 | Kobayashi ................ 123/90.15 |

* cited by examiner

*Primary Examiner* — Gene Crawford
*Assistant Examiner* — Terry Chau
(74) *Attorney, Agent, or Firm* — Morgan, Lewis & Bockius LLP

(57) ABSTRACT

A check valve of a cylinder head controls an oil supply amount to the cylinder head according to oil pressure of a hydraulic pump. The check valve of the cylinder head according to the exemplary embodiment of the present invention may include: a lower cover of cylindrical shape including upper and lower surfaces, the upper surface being open and the lower surface having at least one first oil hole for receiving oil from the hydraulic pump; an upper cover coupled to the upper surface of the lower cover and having a sliding axle and at least one second oil hole; a first plate mounted in the lower cover, sliding vertically along the sliding axle, and having at least one third oil hole that is disposed eccentrically to the at least one second oil hole; and a second plate disposed between the first plate and the lower cover, sliding vertically along the sliding axle, and having at least one fourth oil hole disposed eccentrically to the first, second, and third oil holes.

9 Claims, 13 Drawing Sheets

CHECK VALVE OF CYLINDER HEAD

CROSS-REFERENCE TO RELATED APPLICATION

This application claims priority to and the benefit of Korean Patent Application No. 10-2006-0128178 filed in the Korean Intellectual Property Office on Dec. 14, 2006, the entire contents of which are incorporated herein by reference.

BACKGROUND OF THE INVENTION (a) Field of the Invention

The present invention relates to a check valve of a cylinder head. More particularly, the present invention relates to a check valve of a cylinder head that controls an oil amount supplied to the cylinder head in accordance with oil pressure of a hydraulic pump.

(b) Description of the Related Art

Many components, such as an exhaust valve, an intake valve, a rocker arm assembly, and a cam shaft, are mounted at the cylinder head. Oil is supplied to the cylinder head in order to cool such components.

Generally, a hydraulic pump that supplies the oil to the cylinder head is connected to and driven by a crank shaft. The oil pumped by the hydraulic pump is supplied to the cylinder head through a main gallery of a cylinder block.

Since the hydraulic pump is driven by the crank shaft, as a rotational speed of an engine becomes faster, so does a rotational speed of the hydraulic pump. Therefore, oil supply of the hydraulic pump and oil pressure thereof increase as the engine becomes faster.

Generally oil supplied to the cylinder head must be maintained within a predetermined pressure range. If the oil pressure of the cylinder head is higher than or equal to a predetermined pressure, valve height and valve timing may change. Therefore, a valve train allowing for some degree of operating freedom has been designed such that the engine operates normally even if the oil pressure is higher than or equal to the predetermined pressure.

However, in this case, the valve train may be heavy and the cost may be raised.

In addition, even though the hydraulic pump must supply more oil than is needed in the engine, the hydraulic pump has been designed based on the minimum oil that the hydraulic pump should supply to the engine in the case that the rotational speed of the engine is low. Therefore, surplus oil that remains after being supplied to the engine is exhausted toward an oil fan.

Meanwhile, an orifice or a check valve has been used for controlling the oil supply to the cylinder head. The check valve has a spring for preventing the oil of the hydraulic pump from flowing backward when the oil pressure of the cylinder head is low.

If the orifice or check valve is used, the oil pressure supplied to the cylinder head can be lowered but in this case, the oil pressure supplied to the cylinder head may not be controlled in harmony with the oil pressure of the hydraulic pump.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a check valve of a cylinder head having advantages of reducing weight and cost of a valve train as a consequence of controlling an oil amount supplied to the cylinder head in accordance with an oil pressure of a hydraulic pump.

Further, the present invention has been made in an effort to provide a check valve of a cylinder head having advantages of reducing a required capacity of a hydraulic pump by reducing unnecessary oil supplied to the cylinder head and supplying surplus oil to other parts of an engine when at a high rotational speed of the engine.

A check valve of a cylinder head according to an exemplary embodiment of the present invention may control oil supply to the cylinder head in accordance with oil pressure of a hydraulic pump.

The check valve of the cylinder head according to the exemplary embodiment of the present invention may include: a lower cover of cylindrical shape including upper and lower surfaces, the upper surface being open and the lower surface having at least one first oil hole for receiving oil from the hydraulic pump; an upper cover coupled to the upper surface of the lower cover and having a sliding axle and at least one second oil hole; a first plate mounted in the lower cover, sliding vertically along the sliding axle and having at least one third oil hole that is disposed eccentrically to the second oil hole; and a second plate disposed between the first plate and the lower cover, sliding vertically along the sliding axle and having at least one fourth oil hole disposed eccentrically to the first, second, and third oil holes.

The at least one first oil hole and the at least one fourth oil hole may not communicate with each other in the case that the second plate is contacted with the lower cover.

The at least one fourth oil hole and the at least one third oil hole of the first plate may overlap with each other by as much as a first overlapped portion in the case that the second plate is contacted with the first plate.

The second, third, and fourth oil holes may overlap with each other by as much as a second overlapped portion in the case that the second plate is contacted with the first plate and the first plate is also contacted with the upper cover.

The first and second plates may have first and second insert holes respectively such that the sliding axle attached to the upper cover is inserted therein.

The first plate may be disposed apart from the second plate by a first predetermined distance and the first plate may be disposed apart from the upper cover by a second predetermined distance in the case that oil is not supplied from the hydraulic pump.

A first elastic member may be interposed between the second plate and the upper cover.

At least one second elastic member may be interposed between the first plate and the upper cover.

One of the first plate or the upper cover may have at least one protrusion, and the other may have at least one receiving groove corresponding to the at least one protrusion such that the at least one second elastic member is secured in place between the at least one protrusion and the at least one receiving groove.

An oil supply amount to the cylinder head may be the same as an oil supply amount received from the hydraulic pump in the case that oil pressure is lower than a first pressure.

An oil supply amount to the cylinder head may be reduced to a first oil supply amount by passing through the first overlapped portion in the case that the oil pressure is higher or equal to the first pressure but is lower than a second pressure.

An oil supply amount to the cylinder head may be reduced to a second oil supply amount by passing through the second overlapped portion in the case that the oil pressure is higher than or equal to the second pressure.

The first overlapped portion may be larger than the second overlapped portion.

BRIEF DESCRIPTION OF THE DRAWINGS

The above and other features of the present invention will be described with reference to certain exemplary embodiments thereof illustrated at the accompanying drawings which are given hereinbelow by way of illustration only, and thus are not limitative of the present invention, and wherein.

Figure 1:
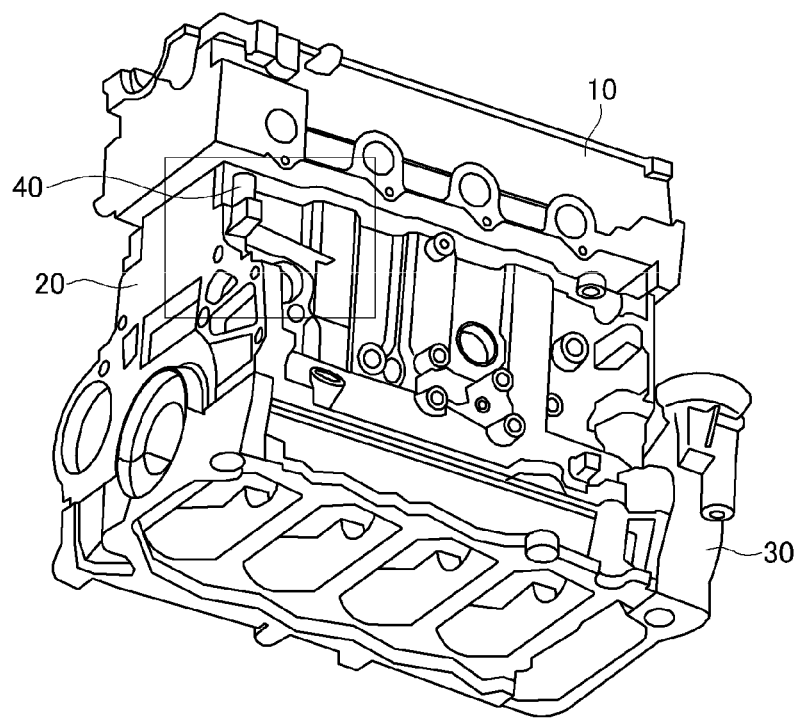
FIG. 1 is a schematic diagram showing a check valve of a cylinder head according to an exemplary embodiment of the present invention mounted between the cylinder head and a cylinder block.

Reference numbers refer to the same or equivalent parts of the present invention throughout the several figures of the drawing.

DETAILED DESCRIPTION OF THE EMBODIMENT

An exemplary embodiment of the present invention will hereinafter be described in detail with reference to the accompanying drawings.

Figure 2:
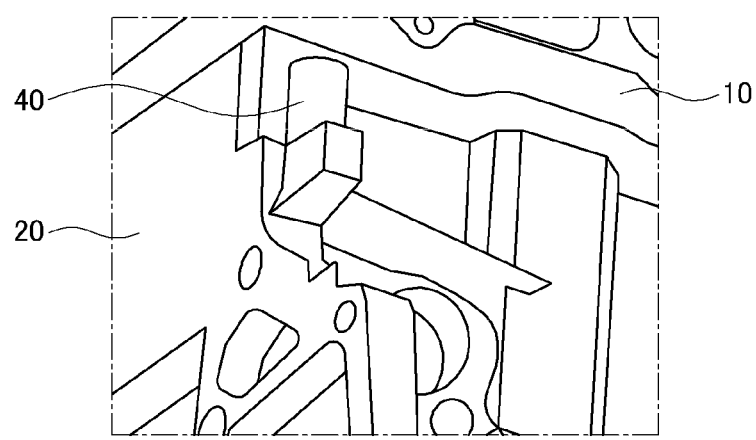
FIG. 2 is a partially enlarged view of the check valve in FIG. 1.

As shown in FIG. 1 and in FIG. 2, a check valve 40 of a cylinder head according to an exemplary embodiment of the present invention is mounted between the cylinder head 10 and a cylinder block 20.

A crank shaft (not shown) is mounted in the cylinder block 20. The crank shaft is driven by a piston. In addition, a hydraulic pump 30 is mounted at one side of the cylinder block 20. A drive shaft of the hydraulic pump 30 is connected to the crank shaft and rotates with the crank shaft. Therefore, the hydraulic pump 30 pumps oil by a rotation of the drive shaft connected to the crank shaft. The oil pumped by the hydraulic pump 30 is supplied to the cylinder block 20, and is then supplied to the cylinder head 10 through the check valve 40.

Figure 3:
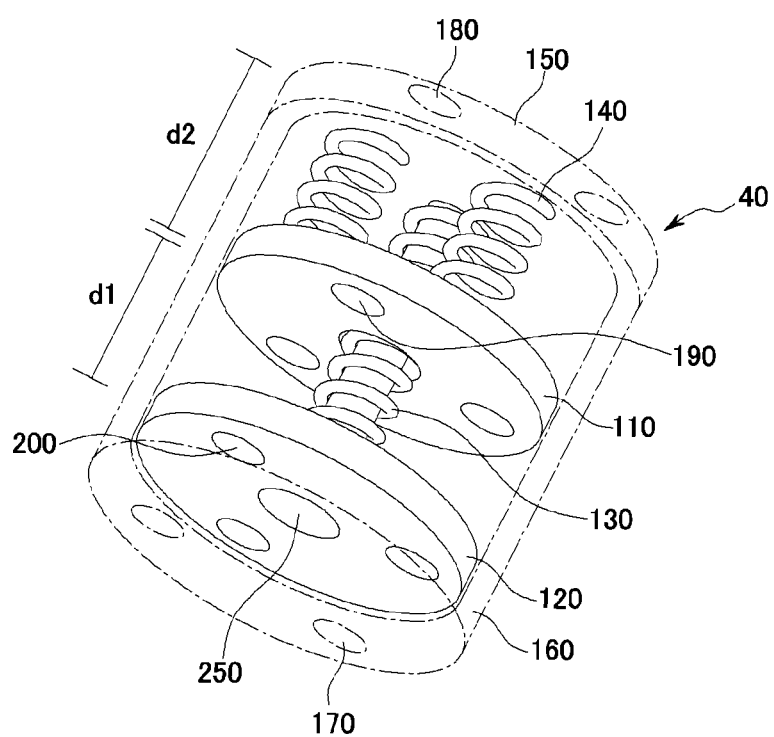
FIG. 3 is a projective view of a check valve of a cylinder head according to an exemplary embodiment of the present invention.

As shown in FIG. 3, the check valve 40 of the cylinder head according to the exemplary embodiment of the present invention includes a lower cover 160, an upper cover 150, a first plate 110, and a second plate 120.

The lower cover 160 has a cylindrical shape, and an upper surface thereof is open. At least one first oil hole 170 is formed at a lower surface of the lower cover 160. The lower cover 160 is connected to the hydraulic pump 30 and receives the oil therefrom through the at least one first oil hole 170. In addition, the first and second plates 110 and 120 are mounted in the lower cover 160.

Figure 5:
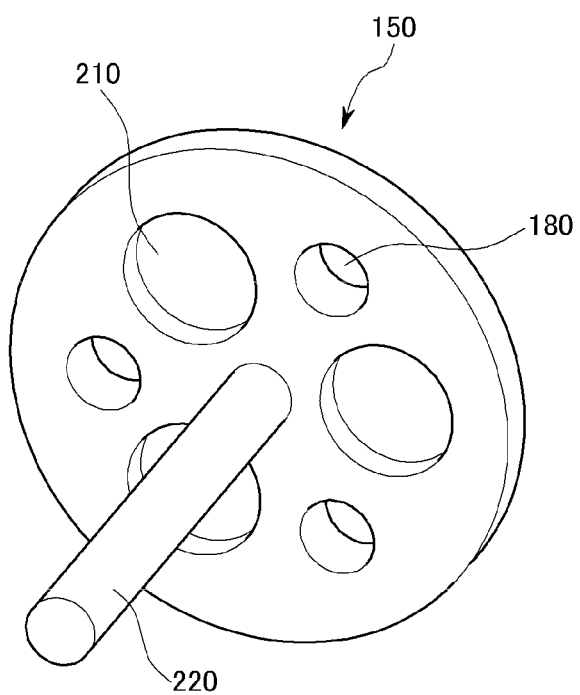
FIG. 5 is a perspective view of an upper cover according to an exemplary embodiment of the present invention.

The upper cover 150 has a disk shape, and is coupled to the upper surface of the lower cover 160. A sliding axle 220, as shown in FIG. 5, is formed at the upper cover 150, and a lower end of the sliding axle 220 is contacted to the lower cover 160. In addition, at least one second oil hole 180 is formed at the upper cover 150, and the oil is supplied to the cylinder head 10 through the at least one second oil hole 180.

In addition, at least one receiving groove 210 may be formed at a lower surface of the upper cover 150 in an embodiment.

Figure 4:
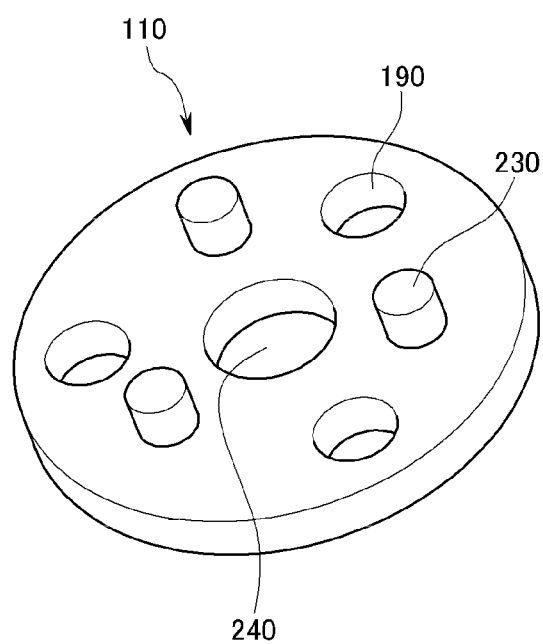
FIG. 4 is a perspective view of a first plate according to an exemplary embodiment of the present invention.

The first plate 110 has a disk shape, and is mounted in the lower cover 160. At least one third oil hole 190 is formed at the first plate 110, and a first insert hole 240 is formed substantially at a middle portion of the first plate 110, as shown in FIG. 4. The at least one third oil hole 190 is disposed eccentrically to the at least one second oil hole 180. The sliding axle 220 is inserted in the first insert hole 240. Therefore, the first plate 110 slides vertically along the sliding axle 220.

In addition, at least one protrusion 230 corresponding to the at least one receiving groove 210 of the upper cover 150 may be formed at an upper surface of the first plate 110.

The second plate 120 has a disk shape and is mounted in the lower cover 160. In addition, the second plate 120 is disposed between the first plate 110 and the lower cover 160.

At least one fourth oil hole 200 is formed at the second plate 120, and a second insert hole 250 is formed substantially at a middle portion of the second plate 120. The at least one fourth oil hole 200 is disposed eccentrically to the first, second, and third oil holes 170, 180, and 190, respectively. The sliding axle 220 is inserted in the second insert hole 250. Therefore, the second plate 120 slides vertically along the sliding axle 220.

In addition, as shown in FIG. 3, in the case that the check valve 40 does not operate, the second plate 120 is contacted to the lower cover 160 and the first plate 110 is respectively disposed apart from the second plate 120 and the upper cover 150 by first and second predetermined distances d1 and d2. The first and second predetermined distances d1 and d2 may be easily obtained by a person of an ordinary skill in the art.

In addition, a first elastic member 130 is interposed between the second plate 120 and the upper cover 150, and at least one second elastic member 140 is interposed between the first plate 110 and the upper cover 150. The first and second elastic members 130 and 140 may be coil springs.

The first elastic member 130 is coiled around the sliding axle 220. The at least one second elastic member 140 is secured in place by the at least one protrusion 230 and the at least one receiving groove 210.

The size and number of the first, second, third, and fourth oil holes 170, 180, 190, and 200 may be the same.

Figure 6:
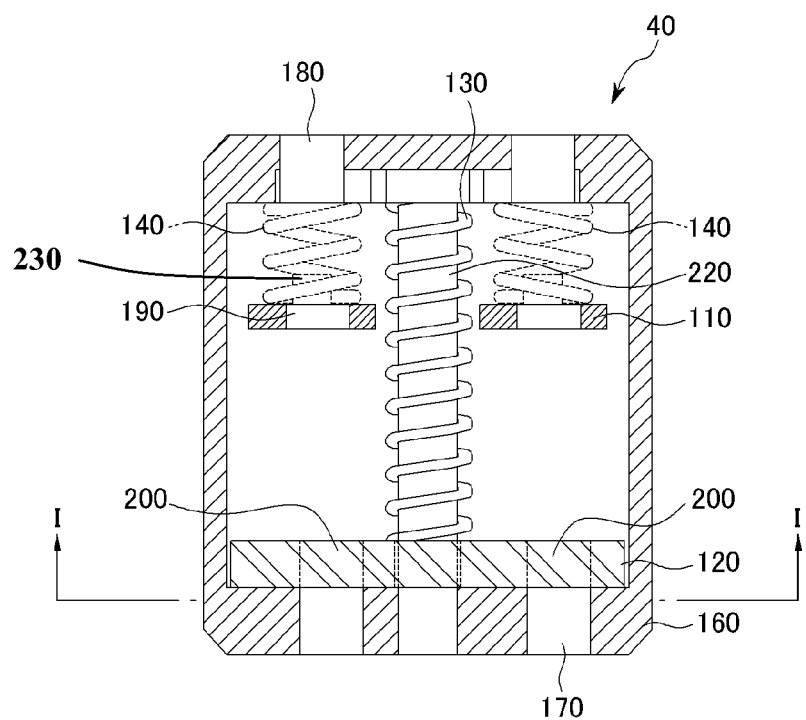
FIG. 6 is a schematic diagram of a check valve in the case that a hydraulic pressure of oil is not applied to the check valve from a hydraulic pump.
Figure 7:
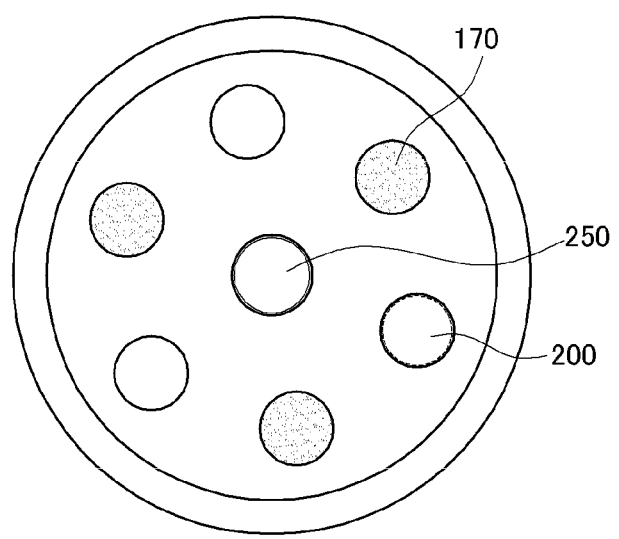
FIG. 7 is a bottom view of the check valve taken along I-I shown in FIG. 6.

The first oil holes 170 and the fourth oil holes 200, as shown in FIG. 7 illustrating the bottom view of FIG. 6, do not correspond to each other. Therefore, in the case that the second plate 120 is contacted to the lower cover 160, the first oil holes 170 and the fourth oil holes 200 do not fluidly communicate with each other and thus the oil is not supplied to the cylinder head 10.

Figure 11:
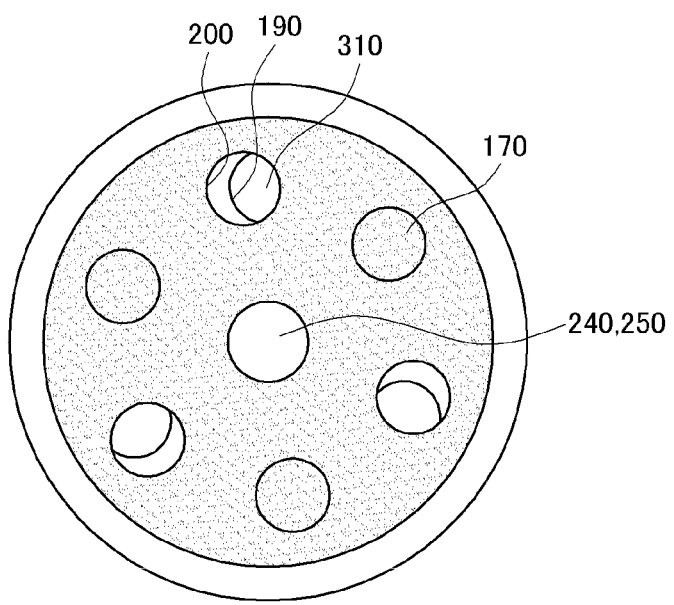
FIG. 11 is a bottom view of the check valve taken along III-III shown in FIG. 10.

The third oil holes 190 and the fourth oil holes 200, as shown in FIG. 11, are disposed eccentrically with each other. Therefore, in the case that the first plate 110 is contacted to the second plate 120, the third and fourth oil holes 190 and 200 overlap with each other by as much as a first overlapped portion 310.

Figure 13:
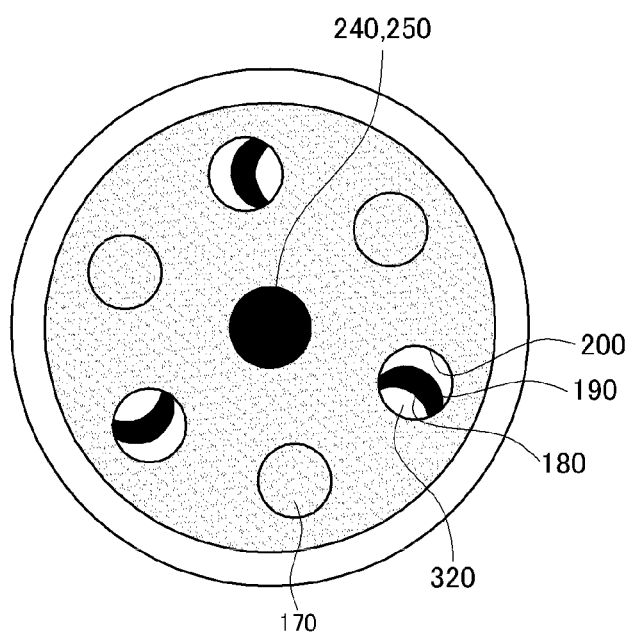
FIG. 13 is a bottom view of the check valve taken along IV-IV shown in FIG. 12.

In addition, the second, third, and fourth oil holes 180, 190, and 200, as shown in FIG. 13, are disposed eccentrically with each other. Therefore, in the case that the second plate 120 is contacted to the first plate 110 and the first plate 110 is also contacted to the upper cover 150, the second, third, and fourth oil holes 180, 190, and 200 overlap with each other by as much as a second overlapped portion 320. The first overlapped portion 310 is larger than the second overlapped portion 320.

Hereinafter, referring to the accompanying drawings, an operation of the check valve of the cylinder head according to the exemplary embodiment of the present invention will be described in detail.

As shown in FIG. 6 and FIG. 7, in the case that the oil is not supplied from the hydraulic pump 30, the second plate 120 is contacted to the lower cover 160. In this case, the first oil holes 170 and the fourth oil holes 200 do not communicate with each other and back flow of the oil may be prevented.

Figure 8:
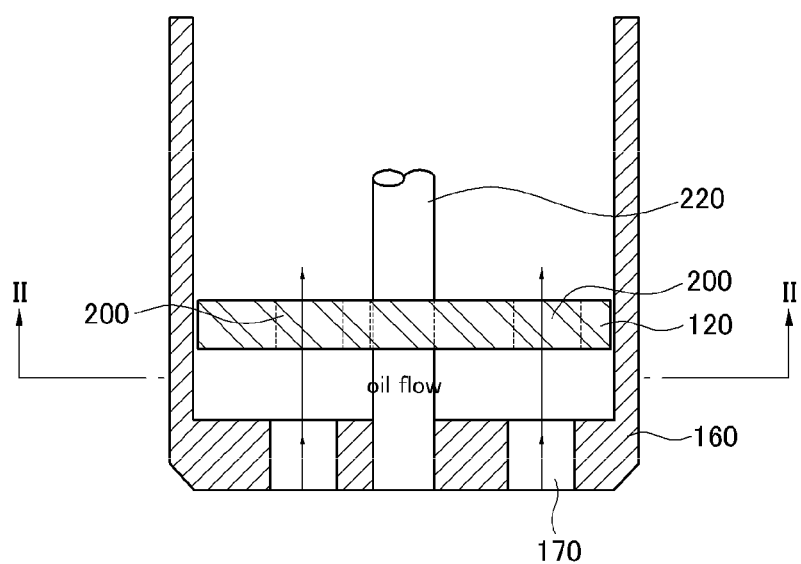
FIG. 8 is a schematic diagram of a check valve in the case that a hydraulic pressure of oil that is lower than a first hydraulic pressure is applied to the check valve according to an exemplary embodiment of the present invention.
Figure 9:
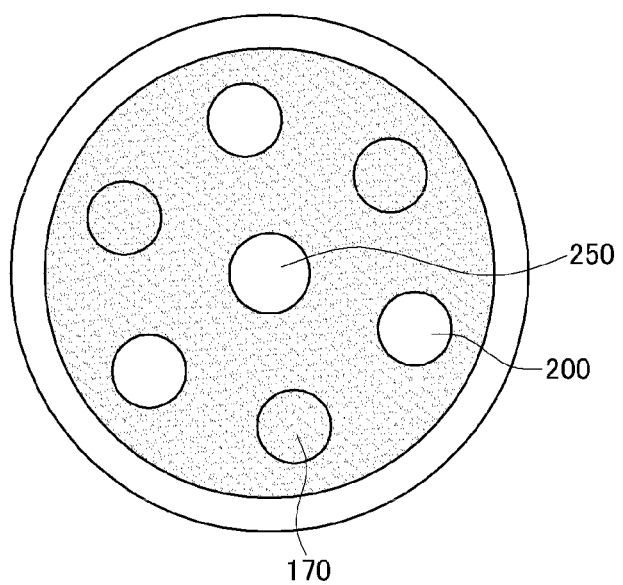
FIG. 9 is a bottom view of the check valve taken along II-II shown in FIG. 8.

As shown in FIG. 8 and FIG. 9, in the case that a hydraulic pressure of oil that is lower than a first hydraulic pressure P1 is applied to the check valve 40, the second plate 120 is contacted to neither of the lower cover 160 nor the first plate 110. The first hydraulic pressure P1 is calculated from the equation P1=k1*d1/A1. Here, k1 is an elastic constant of the first elastic member 130, and A1 is a net cross-sectional area of the second plate 120, i.e., total cross-sectional area of the second plate 120 minus the total cross-sectional area of fourth oil holes 200.

In this case, the oil supplied to the check valve 40 through the first oil holes 170 passes in sequence through the fourth oil holes 200, the third oil holes 190, and the second oil holes 180 and is supplied to the cylinder head 10 with its amount unchanged.

Figure 10:
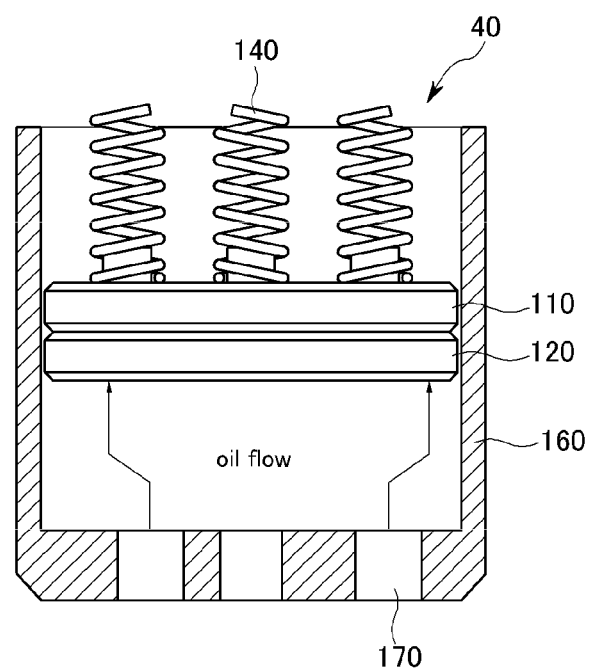
FIG. 10 is a schematic diagram of a check valve in the case that a hydraulic pressure of oil that is higher than or equal to a first hydraulic pressure but is lower than a second hydraulic pressure is applied to the check valve according to an exemplary embodiment of the present invention.

As shown in FIG. 10 and FIG. 11, in the case that a hydraulic pressure of oil that is higher than or equal to the first hydraulic pressure P1 but is lower than a second hydraulic pressure P2 is applied to the check valve 40, the first and second plates 110 and 120 are contacted with each other but the first plate 110 is not contacted to the upper cover 150. The second hydraulic pressure P2 is calculated from the equation P2=k1*(d1+d2)/A2+(Σ(k2*d2))/A2. Here, k2 is an elastic constant of the second elastic member 140 and A2 is the net cross-sectional area of the second plate 120, i.e., total cross-sectional area of the second plate 120 minus the first overlapped portion 310.

In this case, since the first and second plates 110 and 120 are contacted with each other, the third and fourth oil holes 190 and 200 overlap with each other by as much as the first overlapped portion 310. Therefore, the oil supplied through the first oil holes 170 passes through the first overlapped portion 310 and is supplied to the cylinder head 10 through the second oil holes 180. In this case, since the first overlapped portion 310 is smaller than the oil holes 170, 180, 190, and 200, the amount of the oil supply to the cylinder head 10 may be reduced to a first oil supply amount.

Figure 12:
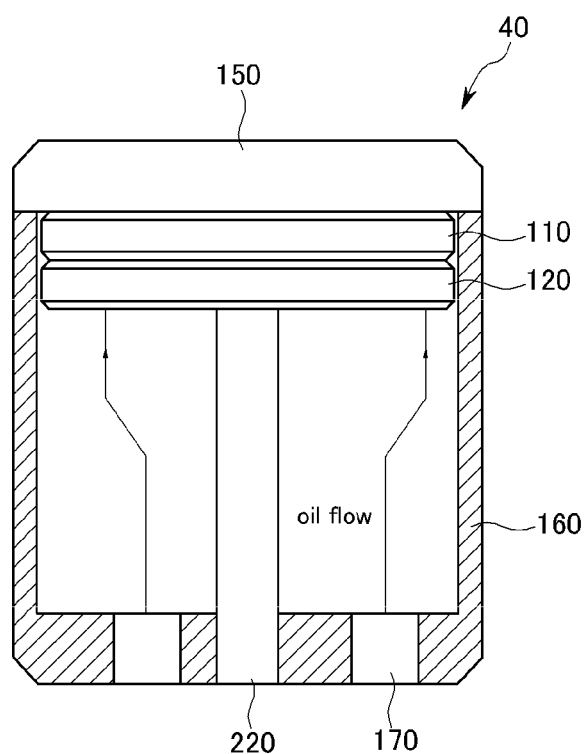
FIG. 12 is a schematic diagram of a check valve in the case that a hydraulic pressure of oil that is higher than or equal to a second hydraulic pressure is applied to the check valve according to an exemplary embodiment of the present invention.

As shown in FIG. 12 and FIG. 13, in the case that a hydraulic pressure of oil that is higher than or equal to the second hydraulic pressure P2 is applied to the check valve 40, the second plate 120 is contacted to the first plate 110 and the first plate 110 is also contacted to the upper cover 150.

In this case, the second, third, and fourth oil holes 180, 190, and 200 overlap with each other by as much as the second overlapped portion 320. Therefore, the oil supplied through the first oil holes 170 passes through the second overlapped portion 320 and is supplied to the cylinder head 10. Since the second overlapped portion 320 is smaller than the first overlapped portion 310, the amount of the oil supply to the cylinder head 10 may be reduced to a second oil supply amount. The second oil supply amount is lesser than the first oil supply amount.

According to the present invention, oil supply to a cylinder head may be controlled according to oil pressure of a hydraulic pump. Therefore, since unnecessary oil is not supplied to the cylinder head, weight and cost of a valve train may be reduced.

In addition, in the case that a rotational speed of an engine is high and thus high pressure oil is supplied from the hydraulic pump, surplus oil may be supplied to other parts of the engine by reducing the unnecessary oil supplied to the cylinder head. Therefore, a required capacity of the hydraulic pump may be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A check valve of a cylinder head, which controls oil supply to the cylinder head in accordance with oil pressure of a hydraulic pump, comprising:
   a lower cover of cylindrical shape comprising upper and lower surfaces, the upper surface being bored and the lower surface having at least one first oil hole for receiving oil from the hydraulic pump;
   an upper cover coupled to the upper surface of the lower cover and having a slide axle and at least one second oil hole;
   a first plate mounted in the lower cover, sliding axially along the slide axle, and having at least one third oil hole that is disposed eccentrically to the at least one second oil hole; and
   a second plate disposed between the first plate and the lower cover, sliding axially along the slide axle, and having at least one fourth oil hole disposed eccentrically to the first, second, and third oil holes;
   wherein the at least one first oil hole and the at least one fourth oil hole do not communicate with each other in the case that the second plate is contacted with the lower cover;
   wherein the at least one fourth oil hole and the at least one third oil hole overlap with each other in an axial direction of the slide axle by as much as a first overlapped portion in the case that the second plate is contacted with the first plate;
   wherein the second, third, and fourth oil holes overlap in the axial direction of the slide axle with each other by as much as a second overlapped portion in the case that the second plate is contacted with the first plate and the first plate is also contacted with the upper cover, and wherein the first overlapped portion is larger than the second overlapped portion and oil amount supplied to the cylinder head is proportional to the first and second overlapped portions.

2. The check valve of claim 1, wherein the first and second plates have first and second insert holes respectively such that the slide axle is inserted therein.

3. The check valve of claim 2, wherein the first plate is disposed apart from the second plate by a first predetermined distance and the first plate is disposed apart from the upper cover by a second predetermined distance in the case that oil is not supplied from the hydraulic pump.

4. The check valve of claim 3, wherein a first elastic member is interposed between the second plate and the upper cover.

5. The check valve of claim 4, wherein at least one second elastic member is interposed between the first plate and the upper cover.

6. The check valve of claim 5, wherein one of the first plate and the upper cover has at least one protrusion, and the other has at least one receiving groove corresponding to the at least one protrusion such that the at least one second elastic member is secured in place by the at least one protrusion and the at least one receiving groove.

7. The check valve of claim 5, wherein an oil supply amount to the cylinder head is the same as an oil supply amount received from the hydraulic pump in the case that a hydraulic pressure of oil is lower than a first hydraulic pressure.

8. The check valve of claim 5, wherein an oil supply amount to the cylinder head is reduced to a first oil supply amount by passing through the first overlapped portion in the case that a hydraulic pressure of oil is higher than or equal to a first pressure but is lower than a second pressure.

9. The check valve of claim 5, wherein an oil supply amount to the cylinder head is reduced to a second oil supply amount by passing through the second overlapped portion in the case that the oil pressure is higher than or equal to a second pressure.

* * * * *